United States Patent
Kuepper et al.

(10) Patent No.: US 11,027,690 B2
(45) Date of Patent: Jun. 8, 2021

(54) INFLATABLE RESTRAINT DEVICE FOR A VEHICLE

(71) Applicant: Ford Global Technologies, LLC, Dearborn, MI (US)

(72) Inventors: Philipp Kuepper, Grevenbroich/NRW (DE); Jamel E. Belwafa, Ann Arbor, MI (US)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 89 days.

(21) Appl. No.: 16/555,228

(22) Filed: Aug. 29, 2019

(65) Prior Publication Data
US 2020/0070767 A1    Mar. 5, 2020

(30) Foreign Application Priority Data
Aug. 30, 2018 (DE) .......................... 102018214729.9

(51) Int. Cl.
*B60R 21/2338* (2011.01)
*B60R 21/217* (2011.01)
*B60R 21/231* (2011.01)
*B60R 21/207* (2006.01)

(52) U.S. Cl.
CPC ........ *B60R 21/2338* (2013.01); *B60R 21/207* (2013.01); *B60R 21/2171* (2013.01); *B60R 21/23138* (2013.01); *B60R 2021/23146* (2013.01); *B60R 2021/23386* (2013.01)

(58) Field of Classification Search
CPC ............ B60R 21/2338; B60R 21/2171; B60R 21/23138; B60R 21/207; B60R 2021/23386; B60R 2021/23146; B60R 2021/23388; B60R 21/231
See application file for complete search history.

(56) References Cited

U.S. PATENT DOCUMENTS

| | | | |
|---|---|---|---|
| 7,374,205 B2 | 5/2008 | Thomas | |
| 7,419,184 B2 | 9/2008 | Green et al. | |
| 7,510,212 B2 | 3/2009 | Green et al. | |
| 7,717,460 B2 | 5/2010 | Franke et al. | |
| 10,336,283 B2 * | 7/2019 | Rickenbach | B60R 21/233 |
| 10,336,284 B2 * | 7/2019 | Dry | B60R 21/2334 |
| 10,864,878 B2 * | 12/2020 | Nagasawa | B60R 21/0132 |
| 10,870,405 B2 * | 12/2020 | Kwon | B60R 21/207 |
| 2017/0334386 A1 | 11/2017 | Park et al. | |
| 2017/0334390 A1 * | 11/2017 | Song | B60R 21/23138 |
| 2019/0283700 A1 * | 9/2019 | Kwon | B60R 21/23138 |
| 2020/0047770 A1 * | 2/2020 | Ozawa | B60W 40/08 |
| 2020/0384941 A1 * | 12/2020 | Kwon | B60R 21/233 |
| 2020/0391691 A1 * | 12/2020 | Fischer | B60R 21/207 |

FOREIGN PATENT DOCUMENTS

| | | |
|---|---|---|
| CN | 105882590 A | 8/2016 |
| KR | 100130600 B1 | 4/1998 |

* cited by examiner

*Primary Examiner* — Drew J Brown
(74) *Attorney, Agent, or Firm* — Frank A. MacKenzie; Bejin Bieneman PLC

(57) ABSTRACT

An inflatable restraint device for fastening to a seat of a vehicle includes at least one inflatable cushion with an outer surface and a plurality of tethers. Each tether includes a first end and a second end. The tethers are fastened at the first ends to the outer surface of the cushion and the second ends of the tethers are designed to be fastened to a seat. The tethers are designed to be releasably fastened on at least one of the ends.

15 Claims, 4 Drawing Sheets

INFLATABLE RESTRAINT DEVICE FOR A VEHICLE

CROSS-REFERENCE TO RELATED APPLICATION

This patent application claims priority to German Application No. DE 102018214729.9 filed on Aug. 30, 2018, which is hereby incorporated by reference in its entirety.

FIELD OF THE DISCLOSURE

The present disclosure relates to an inflatable restraint device, i.e., an airbag system, for fastening to a seat of a vehicle. The disclosure further relates to a vehicle seat and a motor vehicle.

BACKGROUND

Seat assemblies in the prior art may have restraint systems integrated into the seat and including a sidepiece into the seat. The sidepiece is shaped to follow the lateral contour of a vehicle occupant (see FIG. 1). In the case of a potentially imminent impact which has been detected by means of a pre-crash sensor system (based for example on radar sensors, lidar sensors and/or camera sensors), the sidepiece moves forward in the seating direction (see FIG. 2). If the impact has been prevented, the sidepiece moves back into its initial position. If the impact was unavoidable, an airbag stowed in or on the sidepiece is deployed as shown in FIG. 3. FIG. 4 shows the airbag schematically in a section along a longitudinal axis of the seat. A further possible example is that the airbag is stowed directly in the backrest of the seat and is deployed therefrom. In this variant, a sidepiece is not used.

Various devices for cutting off tethers which are arranged in an airbag for the specific shaping thereof are disclosed in the documents U.S. Pat. No. 7,510,212 B1 and U.S. Pat. No. 7,419,184 B2. An airbag system comprising a tether arranged on the outside of the airbag for the positioning thereof is disclosed in the document US 2017/0334386 A1.

In view of the described background it is the object of the present invention to provide an improved inflatable restraint device for a vehicle seat which, in particular, remedies the above-described problems of a vehicle occupant, who is enveloped by an inflated airbag, when disembarking from the vehicle.

SUMMARY

The inflatable restraint device according to the disclosure for fastening to a seat of a vehicle, e.g., a motor vehicle, includes at least one inflatable cushion, i.e., airbag, with an outer surface and a plurality of tethers. Each tether includes a first end and a second end. The tethers are fastened at the first ends to the outer surface of the cushion and the second ends of the tethers are designed to be fastened to a seat of a vehicle. In this case, the tethers are designed to be releasably fastened on at least one of the ends, i.e. for example to be releasable from the inflatable cushion and/or seat.

The inflatable restraint device according to the disclosure has the advantage that in the inflated state the cushion may be easily detached from the seat by a vehicle occupant by the releasably fastened tethers. Thus, the vehicle occupant may be freed automatically and rapidly from the cushion and disembark from the vehicle. This is advantageous, in particular, for vehicle occupants who are susceptible to claustrophobia since these vehicle occupants potentially feel trapped by the inflated cushion. Generally, for the affected vehicle occupants the risk of the occurrence of panic due to an inflated cushion which encloses the vehicle occupants is reduced.

In one example, in the inflated position the cushion is designed to envelope at least partially the head and the front of a vehicle occupant. In this manner, the vehicle occupant is optimally protected in the event of an impact, whilst at the same time by the releasable tethers the possibility is provided of the enveloped position being rapidly and easily terminated.

In an example, the restraint device includes at least one sidepiece which is designed to be rotatably fastened to the side of a vehicle seat. In this example, the second ends of the tethers are fastened to the sidepiece and thus may be indirectly fastened via the sidepiece to a vehicle seat. The sidepiece may be designed, for example, to be rotatably fastened to a backrest and/or to a seat cushion and/or to a seat shell of a vehicle seat and/or to an armrest of a vehicle seat. The sidepiece may be designed such that it is rotatably arranged about an axis perpendicular to a longitudinal axis of the vehicle seat, for example about a horizontal axis. The longitudinal axis of the vehicle seat may be defined, in particular, as the longitudinal axis of a backrest or a seat cushion.

In an example, the device includes a first sidepiece and a second sidepiece. In this case, the first sidepiece is designed to be rotatably fastened to a first side of a vehicle seat, for example to the left-hand side of a vehicle seat, and the second sidepiece is designed to be rotatably fastened to a second side of a vehicle seat, for example to the left-hand side of a vehicle seat. In this case, the terms right-hand side and left-hand side may be defined relative to the seating direction of a vehicle occupant seated on the vehicle seat. A sidepiece which is able to be fastened at a first end to a first side, for example the right-hand side, and at a second end to a second side, for example the right-hand side, of the vehicle seat may also be present.

In particular when viewed from the front, the at least one sidepiece is preferably shaped such that it has the lateral contour of a head and an upper body of a vehicle occupant and/or schematically reproduces such a contour. In particular, the sidepiece may be shaped such that it nestles closely against the lateral contours of a vehicle backrest with a head restraint.

The restraint device may be designed, for example, as a side airbag or front airbag or rollover airbag. It is also possible that the restraint device is designed such that the inflatable cushion inflates centrally from an upper side of the sidepiece relative to the vehicle seat and/or inflates starting from a head restraint of the vehicle seat. In this example, the restraint device is designed to be fastened to a head restraint of a vehicle seat.

The tethers may be designed to be releasable manually, for example by a rip cord or a pull tape, and/or pyrotechnically. In this case, the corresponding pyrotechnical apparatus may be arranged so as to be able to be integrated in a vehicle seat or in a sidepiece which is fastenable to a vehicle seat. The tethers may also be designed such that they are designed to be automatically releasable from a seat or from a sidepiece, for example a sidepiece fastened to the seat. The aforementioned examples permit a simple manual or automatic release of the inflated cushion from the seat or from the sidepiece. For example, the tethers may be designed to be automatically releasable from the seat or from the sidepiece with a fixed time delay after the impact. The affected vehicle occupant is thus only briefly enveloped by the inflated cushion and is quickly in a position to disembark from the vehicle, if required.

In an example, the second ends of the tethers are designed to be fastened to a backrest and/or an armrest and/or a head restraint of a vehicle seat. As a result, on the one hand, an advantageous positioning of the inflatable cushion is possible and at the same time an efficient and optimal removal of the cushion is possible after the use thereof.

The inflatable restraint device may be fastened to the seat, for example on the outside or inside.

The vehicle seat may include a seat cushion, i.e., a seat bottom, and a backrest, i.e., a seatback. The second ends of the tethers are preferably fastened to the backrest. Additionally or alternatively, at least one sidepiece of the restraint device is rotatably fastened at the side to the vehicle seat, in particular rotatably fastened about an axis perpendicular to the longitudinal axis of the vehicle seat, and the second ends of the tethers are fastened to the sidepiece. The vehicle seat comprises a longitudinal axis. The longitudinal axis may, in particular, form the longitudinal axis of the seat cushion and/or the longitudinal axis of the backrest. The backrest may include a right-hand side, a left-hand side and/or corresponding lateral surfaces and an upper side. The upper side may comprise a head restraint. The tethers may be fastened on the right-hand side and/or the left-hand side and/or the upper side, for example on a head restraint, of the backrest.

The motor vehicle may include at least one vehicle seat according to the disclosure as described above. The motor vehicle may be an autonomously driven and/or self-propelled motor vehicle or an at least partially autonomously driven motor vehicle. The motor vehicle may be designed as a passenger motor vehicle, truck, bus, minibus or van. The motor vehicle according to the disclosure has the aforementioned advantages of the inflatable restraint device according to the disclosure and of the vehicle seat according to the disclosure.

As a whole, the present disclosure has the advantage that, on the one hand, a continuous contact is ensured between the inflated airbag and the vehicle seat and/or the sidepiece fastened thereto and thus an effective protection of the head and neck and upper body of a vehicle occupant is ensured. At the same time, the tethers fixing the inflated cushion and/or the airbag may be easily released, for example broken apart or pyrotechnically released or manually released in a different manner from the vehicle seat so that after an impact a vehicle occupant may be freed rapidly and easily from the seat. At the same time, the airbag may be rapidly and easily detached and/or removed from the face of the vehicle occupant, automatically or manually, whereby possible disorientation and panic are avoided.

The disclosure is described in more detail hereinafter with reference to exemplary embodiments and with reference to the accompanying figures. Whilst the disclosure has been specifically illustrated and described in more detail by the preferred exemplary embodiments, the disclosure is not limited by the disclosed examples and other variants may be derived therefrom by the person skilled in the art without departing from the protected scope of the invention.

The figures are not necessarily accurate in terms of detail or to scale and may be shown enlarged or reduced in size in order to provide a clearer overview. Thus functional details disclosed herein are not to be understood as limiting but merely as an illustrative basis which provides a guide to the person skilled in the art in this field of technology in order to use the present disclosure in various ways.

The expression "and/or" which is used herein, if it is used in a series of two or more elements, means that each of the disclosed elements may be used alone or any combination of two or more of the disclosed elements may be used. If, for example, a combination is described that it contains the components A, B and/or C, the combination may contain A alone; B alone; C alone; A and B in combination; A and C in combination; B and C in combination; or A, B and C in combination.

Figure 4:
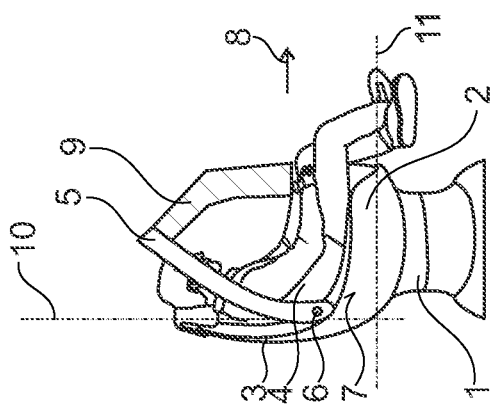
FIG. 4 shows schematically the vehicle seat shown in FIG. 3 in a side view, wherein the inflatable cushion is shown in a sectional view along a central axis of the vehicle seat.
Figure 3:
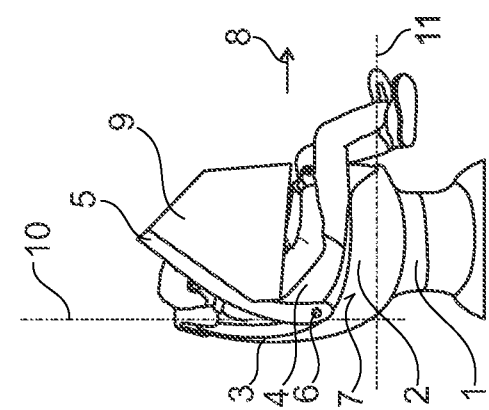
FIG. 3 shows schematically the vehicle seat shown in FIGS. 1 and 2, wherein the inflatable cushion stowed in the sidepiece is shown in an inflated position.

The vehicle seat 1 shown in FIGS. 1 to 4 comprises a seat cushion 2 or a seat shell and a backrest 3. The vehicle seat 1 is shown in a side view. A vehicle occupant 4 seated in the vehicle seat 1 is shown schematically in FIGS. 1 to 4. The seating direction is identified by an arrow 8. The seating direction in this case does not necessarily correspond to the direction of travel.

The vehicle seat 1 has a lateral surface or side surface 7. In this case, it may refer to the side surface of the seat cushion 2 and/or the backrest 3. A sidepiece 5 is rotatably arranged about an axis 6 on the side surface 7. The axis 6 is preferably arranged horizontally. The rotational axis 6 may run, in particular, perpendicular to a longitudinal axis 10 of the backrest 3 and/or perpendicular to a longitudinal axis 11 of the seat cushion 2.

Figure 2:
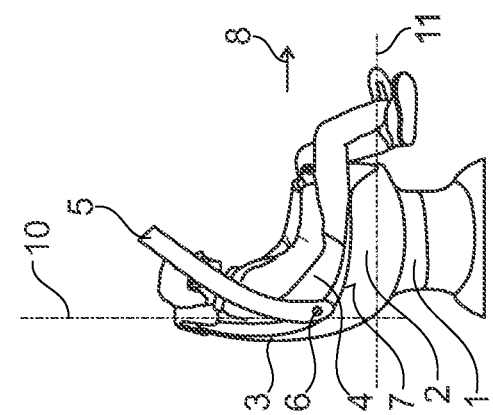
FIG. 2 shows schematically the seat shown in FIG. 1 with a sidepiece rotated to the front before an imminent impact.
Figure 1:
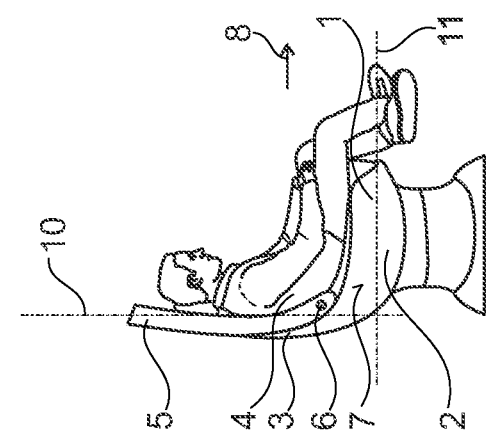
FIG. 1 shows schematically a vehicle seat with an inflatable restraint device cited from the prior art in a stowed state.

An inflatable cushion (airbag) 9 is stowed in the sidepiece 5. For example, if an imminent impact with another vehicle or an obstacle is detected by a pre-crash sensor system, as shown in FIG. 2, the sidepiece 5 is rotated to the front about the rotational axis 6 in the seating direction 8.

In the case of an impact and/or crash, the inflatable cushion 9 is deployed, starting from the sidepiece 5. In the inflated state the cushion 9 encloses the upper body and at least parts of the head of the vehicle occupant 4, as is shown schematically in FIGS. 3 and 4, optionally also the knee and foot region.

Figure 5:
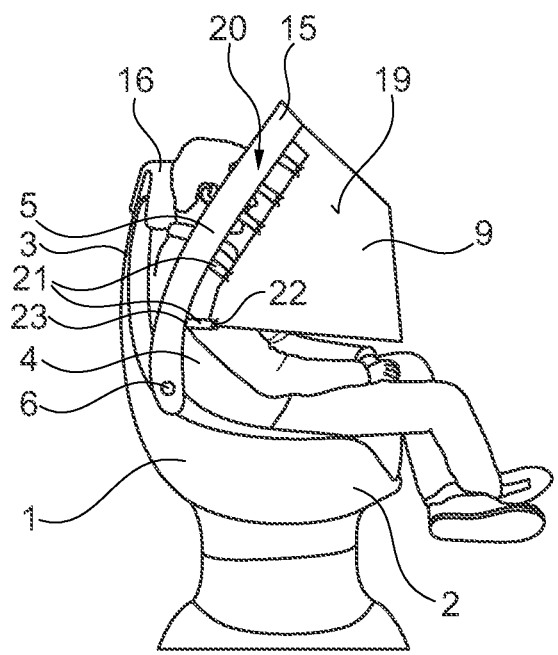
FIG. 5 shows schematically an inflatable restraint device according to the disclosure in combination with a vehicle seat in a perspective view.

FIG. 5 shows an improved inflatable restraint device, starting from the solution shown in FIGS. 1 to 4, in combination with a vehicle seat 1. The inflatable restraint device 20 according to the disclosure, shown in FIG. 5, includes a sidepiece 5, an inflatable cushion 9 with an outer surface 19 and a number of tethers 21. In the variant shown, the inflatable cushion 9 is inflated, starting from an upper region 15 of the sidepiece 5.

The individual tethers 21 in each case have a first end 22 and a second end 23. The first end 22 is respectively fastened to the outer surface 19 of the inflatable cushion 9. In the example shown, the second end 23 is respectively fastened to the sidepiece 5. In this case, the first end 22 and/or the second end 23 is respectively fastened in a releasable manner to the outer surface of the cushion 9 and/or the sidepiece 5. In this case, the tethers 21 may be manually releasable, for example by a rip cord or a pull tape, or automatically releasable, for example pyrotechnically released. For example, the tethers 21 may be automatically released after a specific time delay after an impact. With this example, it is possible for a vehicle occupant 4 to be freed easily and rapidly from the vehicle seat and the vehicle after an impact has taken place.

Figure 6:
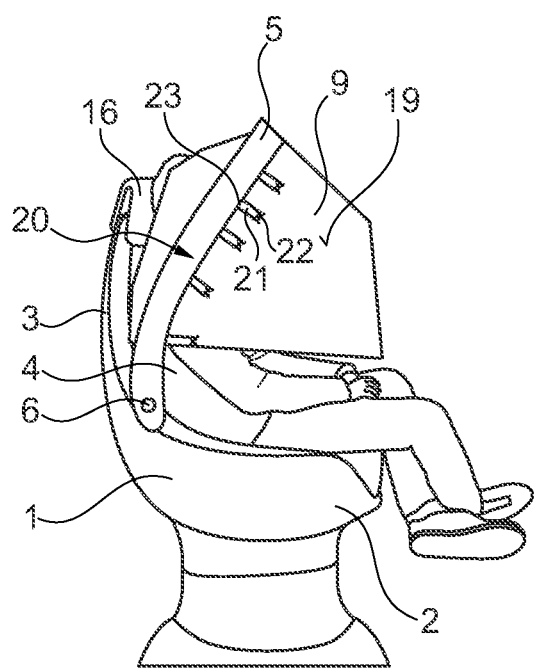
FIG. 6 shows schematically a variant of an inflatable restraint device according to the disclosure in combination with a vehicle seat in a perspective view.

The shown in FIG. 5 the inflatable cushion 9 covers the vehicle occupant 4 from the front, and in the example shown in FIG. 6, the inflatable cushion 9 also encloses the vehicle occupant 4 at the side, i.e. the head and upper body thereof from the front and from the side. In this example, the tethers 21 are fastened to a corresponding lateral position of the cushion 19. In this case, the cushion 19 is designed such that in an inflated state it is arranged between the vehicle occupant 4 and the sidepiece 5.

Figure 7:
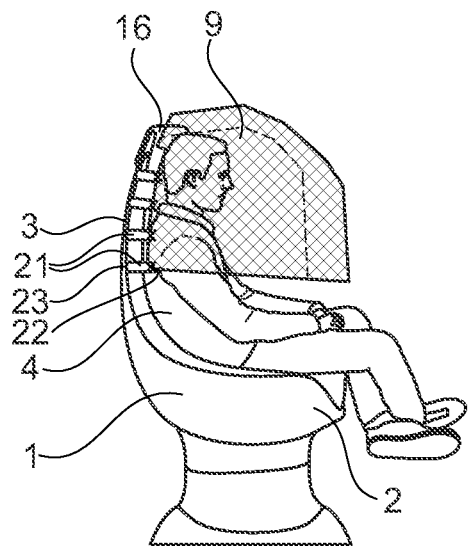
FIG. 7 shows schematically a further variant of an inflatable restraint device according to the disclosure in combination with a vehicle seat in a perspective view.

Another example is shown in FIG. 7. In this example, the inflatable restraint device 20 does not include a sidepiece but is directly integrated in the vehicle seat 1. The cushion 9 is activated from a head restraint or the upper face of a backrest 3 of the vehicle seat 1 and inflated. In this example, the second ends of the tethers 21 are fastened to a side surface 13 of the backrest 3. The second ends may also be fastened to the upper side 16 of the backrest, for example to a head restraint. The fastening may be disconnected in a releasable manner on the backrest 3 and/or on the outer surface 19 of the cushion 9.

Figure 8:
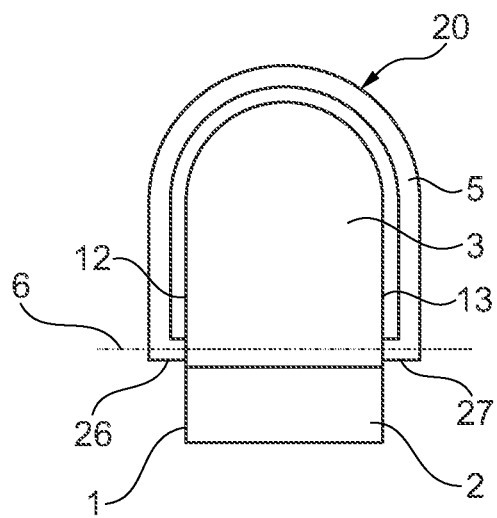
FIG. 8 shows schematically a further variant of an inflatable restraint device according to the disclosure in an initial situation with an inflatable cushion stowed in the sidepiece in a view from the front.

A vehicle seat 1 with an inflatable restraint device 20 which includes a sidepiece 5, in which an inflatable cushion is integrated, is shown schematically in a view from the front in FIG. 8. The sidepiece 5 comprises a first end 26 and a second end 27. The vehicle seat 1 includes a right-hand side 12 and a left-hand side 13. The first end 26 of the sidepiece 5 is rotatably fastened on the right-hand side 12 about the rotational axis 6. The second end 27 of the sidepiece 5 is rotatably fastened on the left-hand side 12 about the rotational axis 6.

Figure 9:
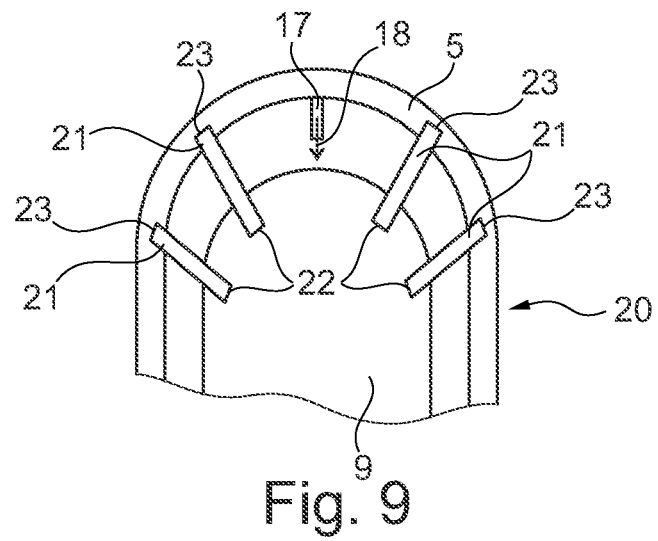
FIG. 9 shows schematically a detail of the variant shown in FIG. 8 with an inflated cushion in a view from the front.
Figure 10:
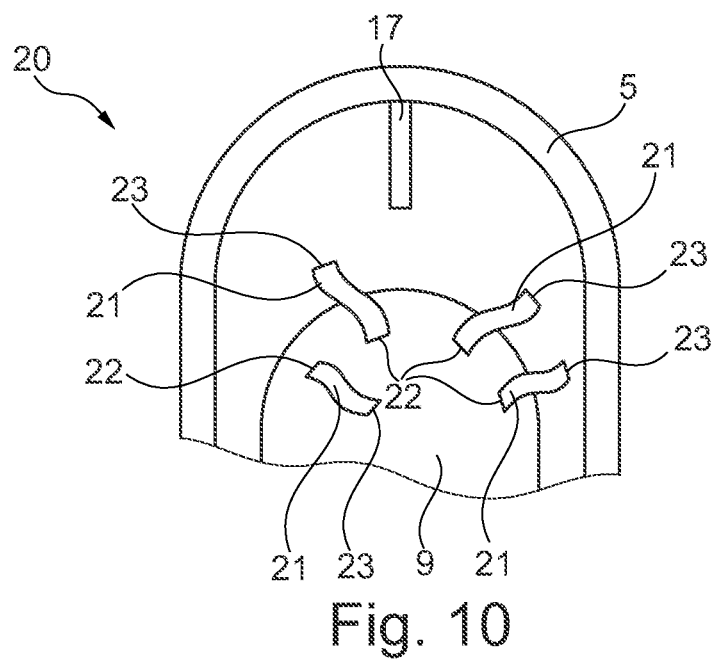
FIG. 10 shows schematically the situation shown in FIG. 9 after actuating the pull tape and/or the automatic release.

FIG. 9 shows schematically a partial region of the restraint device 20, shown in FIG. 8, after an impact. The cushion 9 is in the inflated state and is fastened by means of the tethers 21 to the sidepiece 5. Moreover, in the example shown, a pull tape is present on the upper face of the sidepiece 5, said pull tape being able to be actuated by a vehicle occupant in the pulling direction 18. When actuating the pull tape 17 by pulling in the direction 18, as shown in FIG. 10, the tethers 21 are released at their second end 23 from the sidepiece 5. Additionally or alternatively, when actuating the pull tape 17 the first ends 22 of the tethers 21 may also be released from the cushion 9. A vehicle occupant may thus be easily freed from the cushion 9 and disembark from the vehicle.

Figure 11:
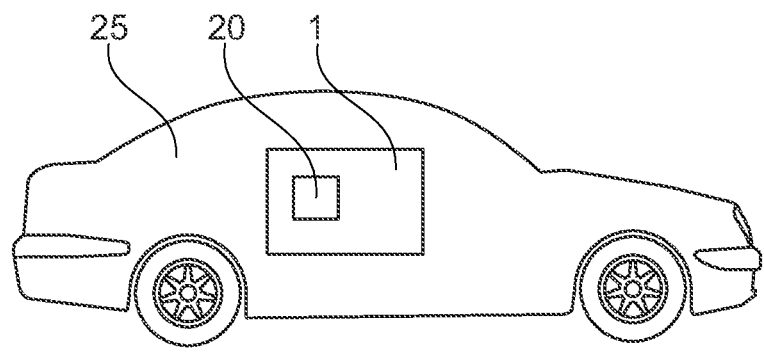
FIG. 11 shows schematically a motor vehicle according to the disclosure.

FIG. 11 shows schematically a motor vehicle according to the disclosure. The motor vehicle 25 according to the disclosure includes at least one vehicle seat 1 according to the disclosure including an inflatable restraint device 20 according to the disclosure. The vehicle seat 1 may be a driver's seat, a passenger seat or a seat for a vehicle occupant, which is designed to be positioned in a second or third seat row. The vehicle seat 1 may be designed for a seating direction in the direction of travel or counter to the direction of travel or a seating direction oriented perpendicular to the direction of travel or a different orientation, such as for example seats rotated slightly inward.

LIST OF REFERENCE NUMERALS

1 Vehicle seat
2 Seat cushion
3 Backrest
4 Vehicle occupant
5 Sidepiece
6 Rotational axis
7 Lateral surface
8 Seating direction
9 Inflatable cushion
10 Longitudinal axis
11 Longitudinal axis
12 Right-hand side
13 Left-hand side
15 Upper region
16 Upper side
17 Rip cord/pull tape
18 Pulling direction
19 Outer surface
20 Inflatable restraint device
21 Tether
22 First end
23 Second end
25 Motor vehicle
26 First end
27 Second end

The invention claimed is:

1. An assembly comprising:
 a seat;
 an inflatable cushion supported by the seat, the inflatable cushion having an outer surface and a plurality of tethers;
 each tether including a first end and a second end, the tethers being fastened at the first ends to the outer surface of the cushion and at the second ends to the seat;
 the tethers are designed to be releasably fastened on at least one of the ends; and
 a sidepiece rotatably fastened to the seat, at least some of the second ends of the tethers being fastened to the sidepiece.

2. The assembly as set forth in claim 1, wherein the inflatable cushion is designed to envelope at least partially the head and the front of the upper body of a vehicle occupant.

3. The assembly as set forth in claim 1, further comprising a second sidepiece rotatably fastened to the seat, at least some of the second ends of the tethers being fastened to the second sidepiece.

4. The assembly as set forth in claim 3, wherein the seat having a seatback having a first side and a second side, the sidepiece being rotatably fastened to the first side of the seatback and the second sidepiece being rotatably fastened to the second side of the seatback.

5. The assembly as set forth in claim 1, wherein the seat has an armrest and the sidepiece is rotatably fastened to the armrest.

6. The assembly as set forth in claim 1, wherein the seat has a head restraint and the sidepiece is rotatably fastened to the head restraint.

7. The assembly as set forth in claim 1, wherein the tethers are designed to be releasable manually and/or pyrotechnically from the seat.

8. The assembly as set forth in claim 1, further comprising a pyrotechnic device between the seat and the tethers to release the tethers from the seat.

9. An assembly comprising:
a seat;
an inflatable cushion supported by the seat, the inflatable cushion having an outer surface and a plurality of tethers;
each tether including a first end and a second end, the tethers being fastened at the first ends to the outer surface of the cushion and at the second ends to the seat;
the tethers are designed to be releasably fastened on at least one of the ends with a rip cord or pull tape.

10. The assembly as set forth in claim 9, wherein the inflatable cushion is designed to envelope at least partially the head and the front of the upper body of a vehicle occupant.

11. The assembly as set forth in claim 9, further comprising a sidepiece rotatably fastened to the seat, at least some of the second ends of the tethers being fastened to the sidepiece.

12. The assembly as set forth in claim 11, further comprising a second sidepiece rotatably fastened to the seat, at least some of the second ends of the tethers being fastened to the second sidepiece.

13. The assembly as set forth in claim 12, wherein the seat having a seatback having a first side and a second side, the sidepiece being rotatably fastened to the first side of the seatback and the second sidepiece being rotatably fastened to the second side of the seatback.

14. The assembly as set forth in claim 11, wherein the seat has an armrest and the sidepiece is rotatably fastened to the armrest.

15. The assembly as set forth in claim 11, wherein the seat has a head restraint and the sidepiece is rotatably fastened to the head restraint.

* * * * *